Figure 1:
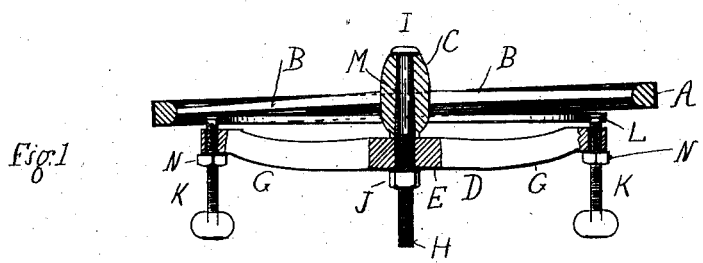

H. E. WITHERED.
ADJUSTABLE DISH STAFF.
APPLICATION FILED OCT. 14, 1907.

905,484.

Patented Dec. 1, 1908.

Witnesses
John A Hulit
J. O. Dill

Inventor
Henry E. Withered
By J. A. Rosen
atty

UNITED STATES PATENT OFFICE.

HENRY E. WITHERED, OF LE ROY, KANSAS, ASSIGNOR OF ONE-THIRD TO D. B. ROWE, OF LE ROY, KANSAS.

ADJUSTABLE DISH-STAFF.

No. 905,484.   Specification of Letters Patent.   Patented Dec. 1, 1908.

Application filed October 14, 1907. Serial No. 397,430.

*To all whom it may concern:*

Be it known that I, HENRY E. WITHERED, a citizen of the United States, residing at Le Roy, in the county of Coffey and State of Kansas, have invented new and useful Improvements in Adjustable Dish-Staves, of which the following is a specification.

The object of my invention is to provide a strong, durable, cheaply-made, and efficient device, of simple construction and operation, which is useful not only for correcting the dish of a wheel in repairing same, but also for serving as a guide in inserting spokes both in the making and in the repairing of a wheel and for applying and resetting tires, both hot and cold. And to this end my invention comprises a clamping frame adapted to bear against the hub and provided with multiple radial arms, a draw-bolt adapted to extend through the hub for drawing the frame rigidly against the hub, a circular guide adapted to bear against the spokes inside the felly, and screws swiveled to said guide and threaded through said radial arms; and my invention also consists of the parts, improvements, and combinations hereinafter described and claimed.

In the drawings accompanying and forming part of this specification, and in the description thereof, I have shown my invention in its preferred form, and have shown what I deem to be the best mode of applying the principles thereof; but it is to be understood that the invention itself is not to be confined to the exact drawings or the description of said drawings; and that, within the scope of the appended claims, I contemplate changes in form, proportions, and materials, the transposition of parts, and the substitution of equivalent members, without departing from the spirit of the invention.

Figure 2:
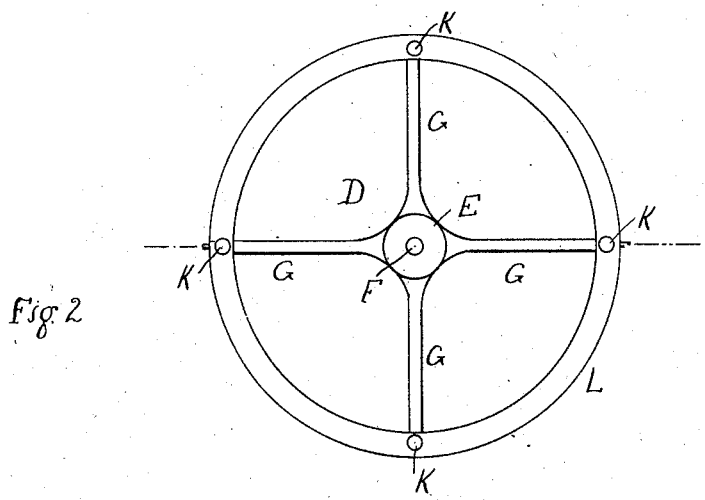
Figure 3:

Figure 1 is a sectional view of a device made in accordance with the principles of my invention, applied to a wheel in a position preparatory to correcting the dish thereof, the section being shown on a plane substantially through the center. Fig. 2 is a plan view of the adjustable dish-staff. Fig. 3 is a center sectional view of the cone used for more rigidly securing the frame to the hub.

Similar reference characters indicate like or corresponding parts throughout the several views.

A represents the tire and felly of a wheel; B, B are the spokes; and C is the hub.

D represents the frame of my adjustable dish-staff, more specifically comprising a central bearing E adapted to fit against the end of the hub, and multiple radial arms G, G, here shown as four in number though there may be three or more. Through the center of the bearing is a hole F, through which is extended a draw-bolt H, which also extends through the hub C, the head I bearing against the opposite end of the hub, and the nut J bearing against the frame of the dish-staff.

K, K are set-screws threaded through the ends of the arms G, G, respectively, and swiveled to the circular guide L; and N, N are jam-nuts for firmly holding the set-screws in any desired position. The circular guide L is of a size adapted to bear against the spokes of the wheel inside the tire and felly, for the purposes hereinafter explained.

M is a cone-shaped plug or bushing adapted to be inserted in the hub and to embrace quite closely the draw-bolt H, so as to hold the draw-bolt rigidly therein and prevent any lateral movement thereof.

The mode of operation of my device is as follows: The frame is first applied to the hub and rigidly secured thereto by means of the draw-bolt, with the plane of the frame at exact right-angles to the axis of the hub, or parallel to the plane of the wheel. This position is assured in substantially all instances, by reason of the bearing E being drawn tightly against the end of the hub. To further insure the rigidity of the application, however, the cone-shaped bushing M may also be used as indicated. In thus applying the frame to the hub, the guide L should be on the side toward the wheel, with the set-screws unscrewed, as indicated in the drawings, where a dish is to be corrected. To correct the dish, it becomes necessary, the frame being applied to the hub, only to screw in the set-screws to push the spokes over to their proper positions; but in my appliance, it will be noted that in bearing against the spokes on the one side (the left-hand side, for instance), the frame does not act as a lever against the spokes on the other side (the right-hand side), the strain being borne by the center bearing, draw-bolt, and hub, thereby preventing the tendency which would otherwise be present of displacing the spokes on one side in adjusting the spokes on the other side. It will also be noted that with my device, the frame is first applied to the hub, and the pressure is applied by the set-screws in the radial arms.

In inserting spokes, both in the manufacture of wheels and in the repairing, my device is also useful. The frame is applied to the hub as just described; the circular guide is then adjusted to a proper position to serve as a guide for inserting the spokes, where it may be securely held by the jam-nuts N, N; and the spokes may then be driven into the hub while bearing against the guide. It will also be noted that the same appliance is also well adapted for holding the wheel in applying or resetting tires, either hot or cold, as the location of the guide, inside the felly, permits complete and free access to the felly and tire for the application of the tire, and yet my device holds the parts in their proper positions.

I do not know of any adjustable dish-staff having a range of utility, as herein described, or of the simple and efficient construction of my device.

What I claim is:

1. An adjustable dish-staff comprising the combination of a frame, a means for rigidly securing same to the hub of a wheel, a circular guide adapted to bear against the spokes inside the felly, and a means for adjustably securing said guide to said frame, substantially as set forth.

2. An adjustable dish-staff comprising the combination of a frame, a draw-bolt for rigidly securing the frame to the hub of a wheel, a circular guide adapted to bear against the spokes inside the felly, and set-screws swiveled to said guide and threaded through said frame, substantially as set forth.

3. An adjustable dish-staff comprising the combination of a frame, a draw-bolt for rigidly securing the frame to the hub of a wheel, a circular guide adapted to bear against the spokes inside the felly, set-screws swiveled to the guide and threaded through the frame, and jam-nuts on said screws adjacent to the frame, substantially as set forth.

4. An adjustable dish-staff comprising the combination of a central bearing having a hole therethrough and adapted to bear against the end of a hub, a draw-bolt extending through said hole and adapted to be extended through the hub for rigidly holding said center bearing against the end of the hub, multiple arms radiating from said center bearing, a circular guide adapted to bear against the spokes inside the felly, set-screws swiveled to said guide and threaded through said respective radial arms, and jam-nuts for said respective set-screws.

HENRY E. WITHERED.

Witnesses:
BEN. F. SHAMBAUGH,
WALTER GIESY.